US008877525B1

(12) United States Patent (10) Patent No.: US 8,877,525 B1
Leobandung et al. (45) Date of Patent: Nov. 4, 2014

(54) LOW COST SECURE CHIP IDENTIFICATION

(71) Applicant: International Business Machines Corporation, Armonk, NY (US)

(72) Inventors: Effendi Leobandung, Wappingers Falls, NY (US); Dirk Pfeiffer, Cronton on Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/950,673

(22) Filed: Jul. 25, 2013

(51) Int. Cl.
*H01L 21/66* (2006.01)
*G01R 31/28* (2006.01)
*G06F 21/88* (2013.01)
*G06F 21/73* (2013.01)

(52) U.S. Cl.
CPC ............ *H01L 22/12* (2013.01); *G01R 31/2896* (2013.01); *G06F 21/88* (2013.01); *G06F 21/73* (2013.01); *H01L 22/34* (2013.01); *H01L 2223/54433* (2013.01)
USPC .................... 438/14; 438/16; 438/17; 438/18; 257/E21.53; 714/733; 726/34; 324/762.01; 324/762.02; 324/750.15

(58) Field of Classification Search
CPC ......... H01L 22/12; H01L 22/34; H01L 22/32; H01L 2223/54433; G01R 31/2896; G06F 21/73; G06F 21/88
USPC ........ 438/14, 16, 17, 18, 10, 11; 257/E21.53; 714/733; 726/34; 324/750.15, 762.01, 324/762.02
See application file for complete search history.

(56) References Cited

U.S. PATENT DOCUMENTS

| 7,705,621 | B2 * | 4/2010 | Lee et al. ................... 324/750.3 |
| 8,073,241 | B2 * | 12/2011 | Fushida et al. ................ 382/149 |
| 8,198,645 | B2 | 6/2012 | Sakai |
| 8,525,169 | B1 * | 9/2013 | Edelstein et al. ............... 257/48 |
| 2009/0083833 | A1 * | 3/2009 | Ziola et al. ........................ 726/2 |
| 2013/0032779 | A1 | 2/2013 | Huang et al. |
| 2014/0159040 | A1 * | 6/2014 | Dimitrakopoulos et al. ... 257/48 |

FOREIGN PATENT DOCUMENTS

| CN | 202094167 U | 12/2011 |
| CN | 202189826 U | 4/2012 |
| CN | 102832302 A | 12/2012 |
| JP | 4889142 | 12/2011 |

OTHER PUBLICATIONS http://en.wikipedia.org/wiki/Semiconductor_device_fabrication, "Semiconductor device fabrication" printed May 24, 2013, 8 pages.
http://semimd.com/blog/tag/yield/, "Yield Semiconductor Manufacturing & Design Co—Flash Player Installation" printed May 24, 2013, 22 pages.
http://mrhackerott.org/semiconductor-informatics/informatics/tutorial/smeda.pdf, "Semiconductor Manufacturing and Engineering Data Analysis" printed May 24, 2013, 39 pages.

* cited by examiner

*Primary Examiner* — Michael Trinh
(74) *Attorney, Agent, or Firm* — Scully, Scott, Murphy & Presser, P.C.; Louis J. Percello, Esq.

(57) ABSTRACT

Mechanisms are provided for chip (e.g., semiconductor chip) identification (e.g., low cost secure identification). In one example, a method of manufacturing for implementing integrated chip identification is provided. In another example, a method of using a chip with an integrated identification is provided.

24 Claims, 9 Drawing Sheets

LOW COST SECURE CHIP IDENTIFICATION

BACKGROUND

The present disclosure relates generally to the field of chip (e.g., semiconductor chip) identification (e.g., low cost secure identification).

The need for secure computing is often critical in today's world. For example, it is often critical to ensure that a computer with which a communication is being carried out is indeed the intended computer. As described herein, one way to do this is to embed identification information inside the semiconductor chip (e.g., CPU) of the computer.

It is important that the identification mechanism used be clone proof (or nearly so). In this regard, it is noted that simply "blowing" one or more macroscopic fuses in a semiconductor chip (to use as an identifier) is not sufficiently secure because such a chip may be easily cloned by opening the package and examining the chip under an SEM (scanning electron microscope).

SUMMARY

In one example, the present disclosure relates to the field of chip (e.g., semiconductor chip) identification (e.g., low cost secure identification).

In one embodiment, a method for manufacturing a semiconductor device having an identifiable indicium, the semiconductor device comprising a microprocessor and a memory array having a plurality of contacts, is provided, the method comprising: designing a nominal layout of the contacts of the memory array; designing a nominal photo lithography mask for producing the nominal layout of the contacts of the memory array; selecting a plurality of the contacts of the designed memory array for production as defective contacts; producing the photo lithography mask based upon: (a) the designed nominal photo lithography mask; and (b) the selected contacts to be produced as defective contacts; manufacturing the semiconductor device including the microprocessor and the memory array using the produced photo lithography mask, wherein the manufactured memory array includes a plurality of actually defective contacts; and scanning the memory array by the microprocessor to identify the plurality of actually defective contacts, the scanned plurality of actually defective contacts comprising the identifiable indicium.

In another embodiment, a method for utilizing a semiconductor device having an identifiable indicium, the semiconductor device comprising a microprocessor and a memory array having a plurality of defective contacts, is provided, the method comprising: receiving, by the microprocessor, a received indicium; scanning the memory array by the microprocessor to identify the plurality of defective contacts, the identified defective contacts comprising the identifiable indicium; comparing by the microprocessor the received indicium with the identifiable indicium; and indicating by the microprocessor, based upon the comparison, whether the received indicium matches the identifiable indicium.

In another embodiment, a computer readable storage medium, tangibly embodying a program of instructions executable by the computer for manufacturing a semiconductor device having an identifiable indicium, the semiconductor device comprising a microprocessor and a memory array having a plurality of contacts, is provided, the program of instructions, when executing, performing the following steps: designing a nominal layout of the contacts of the memory array; designing a nominal photo lithography mask for producing the nominal layout of the contacts of the memory array; selecting a plurality of the contacts of the designed memory array for production as defective contacts; producing the photo lithography mask based upon: (a) the designed nominal photo lithography mask; and (b) the selected contacts to be produced as defective contacts; manufacturing the semiconductor device including the microprocessor and the memory array using the produced photo lithography mask, wherein the manufactured memory array includes a plurality of actually defective contacts; and scanning the memory array by the microprocessor to identify the plurality of actually defective contacts, the scanned plurality of actually defective contacts comprising the identifiable indicium.

In another embodiment, a computer readable storage medium, tangibly embodying a program of instructions executable by a microprocessor of a semiconductor device for utilizing an identifiable indicium of the semiconductor device, the semiconductor device comprising the microprocessor and a memory array having a plurality of defective contacts, is provided, the program of instructions, when executing, causing the microprocessor to perform the following steps: receiving a received indicium; scanning the memory array to identify the plurality of defective contacts, the identified defective contacts comprising the identifiable indicium; comparing the received indicium with the identifiable indicium; and indicating, based upon the comparison, whether the received indicium matches the identifiable indicium.

BRIEF DESCRIPTION OF THE DRAWINGS

Various objects, features and advantages of the present invention will become apparent to one skilled in the art, in view of the following detailed description taken in combination with the attached drawings, in which.

DETAILED DESCRIPTION

In one example, one or more systems may provide for automatically labeling (that is, identifying) semiconductor devices (e.g., chips) using defects. In another example, one or more methods may provide for automatically labeling (that is, identifying) semiconductor devices (e.g., chips) using defects. In another example, one or more algorithms may provide for automatically labeling (that is, identifying) semiconductor devices (e.g., chips) using defects.

For the purposes of this disclosure the term "unique" (such as used in the context of a unique indicium) is intended to refer to either an indicium that only exists once or an indicium that is statistically unlikely to occur more than once (e.g., unique within a combination of $4^{180}$).

For the purposes of this disclosure the term "random" (such as used in the context of random selection) is intended to refer to either a random selection or to a pseudo-random selection (such as is typically performed by a computer).

Semiconductor device manufacturing is a well-known process. Part of the process typically involves photo lithography. During such photo lithography a wafer (e.g., silicon wafer) is coated with a chemical called a photoresist. A mask is placed over the wafer and select portions of the wafer under the mask are exposed to light (e.g., short wavelength light). The exposed regions are washed away by a developer solution.

Figure 1:
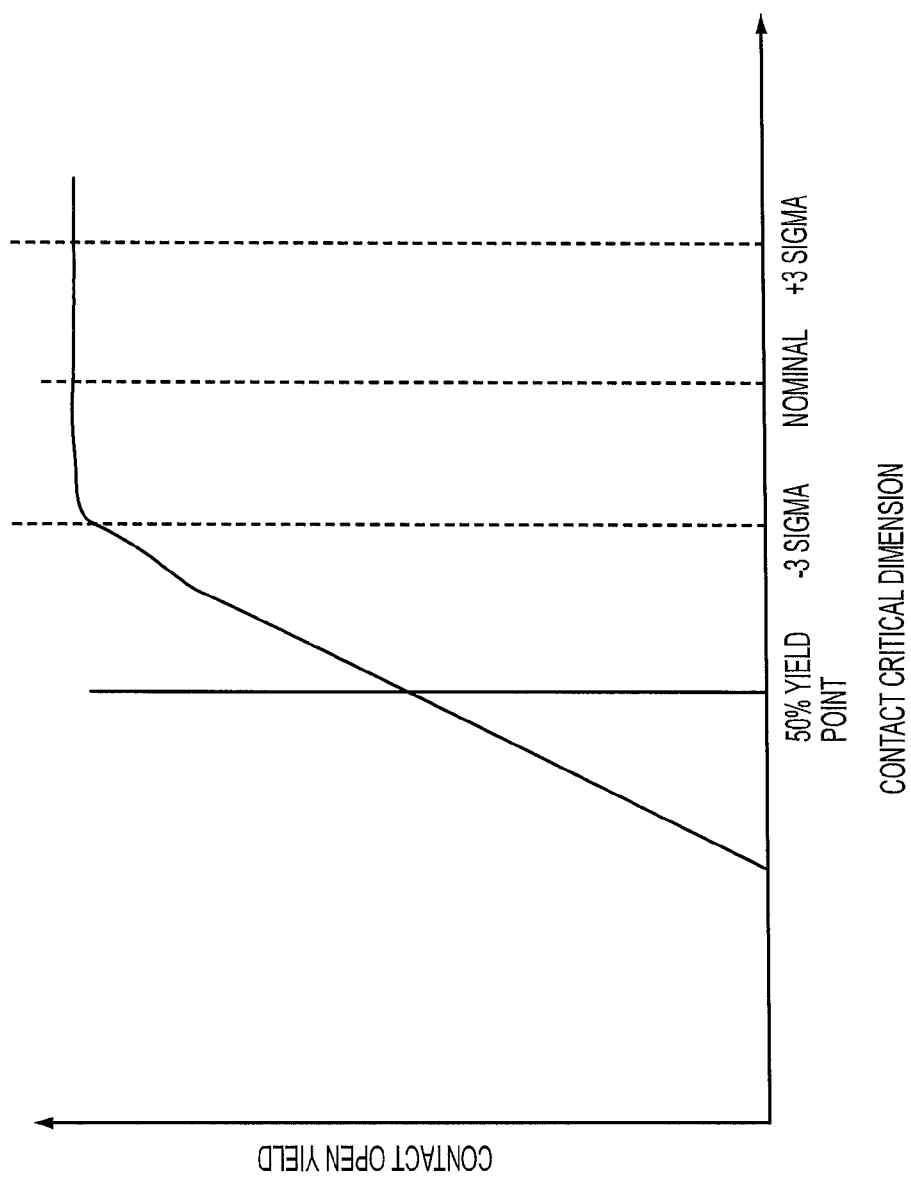
FIG. 1 depicts a graph of typical contact open yield versus contact critical dimension in the context of a conventional semiconductor device manufacturing process.

It is known in the conventional semiconductor device manufacturing process that defects will typically exist in the finished product. For example, it is known that contact open yield is highly dependent on contact size. FIG. 1 depicts a graph of typical contact open yield versus contact critical dimension in the context of a conventional semiconductor device manufacturing process.

Various embodiments leverage such defects (which are typically undesirable) in order to store secure chip identification information. In one example, the defects are produced by intentionally printing a plurality of contact smalls (that is, mask openings that are smaller than would typically be used). In one specific example, if a given generation of semiconductor chip typically uses mask contact openings of about 60-64 nanometers, the contact smalls used herein may be about 50 nanometers As described herein, the contact defects may be embedded in on-board chip memory. Such embedding may provide a mechanism such that there is essentially no practical way anyone can know which contacts store the identification information (thus being secure against cloning the identification information).

Reference will now be made to an example implementation according to one embodiment. In this example, the identification information is stored in a typical cache memory of greater than 1 GB. There is a dedication (for the purposes of providing identification information) of approximately 10-100 bit lines in the memory array where the metal-to-metal contact critical dimension is intentionally run small (e.g., the mask spacing is about 50 nanometers). The selected bit lines may be randomly chosen from hundreds of thousands of bit lines in the mask making process (since the typical chip has bit/word line redundancy, this will not significantly impact chip operation). Each bit line can be about 64 bits. Therefore, there are a total of about 640-6400 cells in this example that have an equal chance of working or failing. The microprocessor will scan (e.g., at the time of manufacture or shortly thereafter) the whole memory array to identify the location of the failing bits. These defects will be used as the secure chip identification.

In one specific example, the location information used for chip identification is essentially unique with $4^{180}$ combinations.

In another specific example, the area increase for the chip is insignificant and a very small percent of memory capacity is used for identification purposes.

In another specific example, it is impossible (or impractical) to replicate or clone the chip (to determine the locations of defects, someone would need to de-layer the chip and find all the small contacts; such a de-layering process would introduce so many defects it would be close to impossible to identify all small the contacts).

Figure 2:
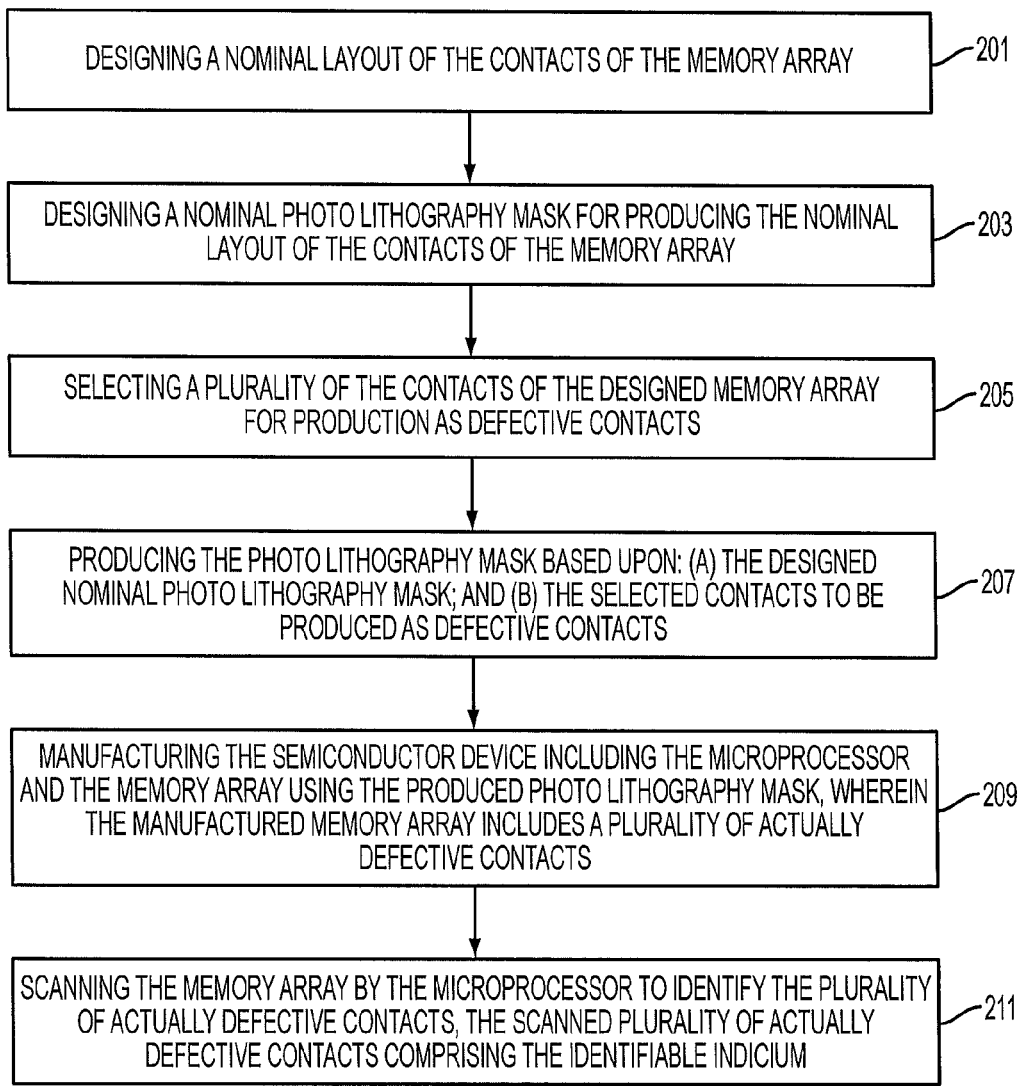
FIG. 2 depicts a flowchart of a method according to an embodiment.

Referring now to FIG. 2, a method for manufacturing a semiconductor device having an identifiable indicium, the semiconductor device comprising a microprocessor and a memory array having a plurality of contacts, is shown. As seen in this FIG. 2, the method of this embodiment comprises: at 201—designing a nominal layout of the contacts of the memory array; at 203—designing a nominal photo lithography mask for producing the nominal layout of the contacts of the memory array; at 205—selecting a plurality of the contacts of the designed memory array for production as defective contacts; at 207—producing the photo lithography mask based upon: (a) the designed nominal photo lithography mask; and (b) the selected contacts to be produced as defective contacts; at 209—manufacturing the semiconductor device including the microprocessor and the memory array using the produced photo lithography mask, wherein the manufactured memory array includes a plurality of actually defective contacts; and at 211—scanning the memory array by the microprocessor to identify the plurality of actually defective contacts, the scanned plurality of actually defective contacts comprising the identifiable indicium.

In one example, any steps described above may be carried out in any appropriate desired order.

In another example, the scanning step 211 may be performed as follows: write 0 or 1 to the entire array and then come back and read the 0 or 1 and compare it with expected value. The bit line and word line are varied to address each single bit.

Figure 3:
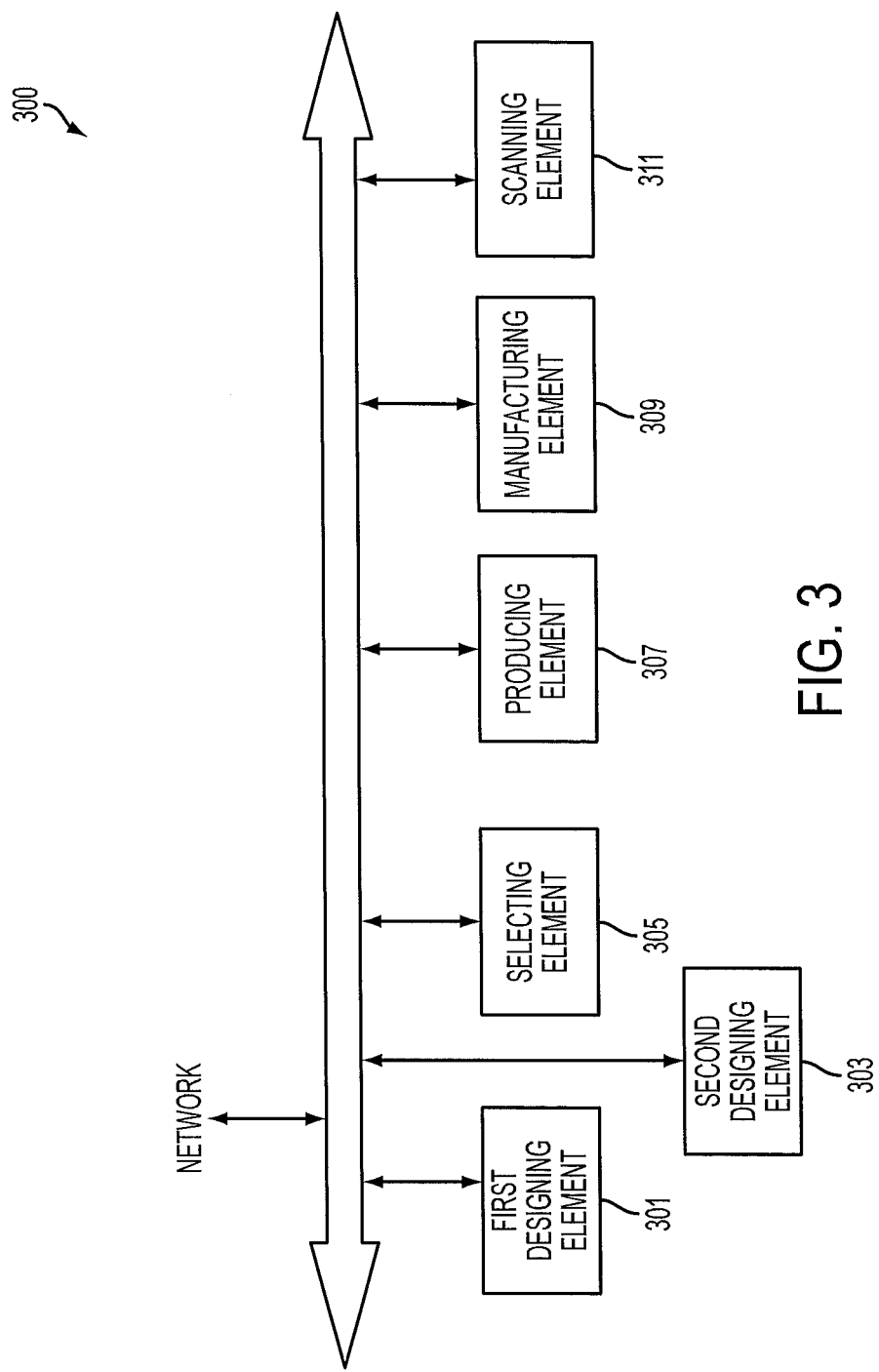
FIG. 3 depicts a block diagram of a system according to an embodiment.

Referring now to FIG. 3, in another embodiment, a system 300 for manufacturing a semiconductor device having an identifiable indicium, the semiconductor device comprising a microprocessor and a memory array having a plurality of contacts, is provided. This system may include the following elements: a first designing element 301 configured to design a nominal layout of the contacts of the memory array; a second designing element 303 configured to design a nominal photo lithography mask for producing the nominal layout of the contacts of the memory array; a selecting element 305 configured to select a plurality of the contacts of the designed memory array for production as defective contacts; a producing element 307 configured to produce the photo lithography mask based upon: (a) the designed nominal photo lithography mask; and (b) the selected contacts to be produced as defective contacts; a manufacturing element 309 configured to manufacture the semiconductor device including the microprocessor and the memory array using the produced photo lithography mask, wherein the manufactured memory array includes a plurality of actually defective contacts; and a scanning element 311 configured to scan the memory array to identify the plurality of actually defective contacts, the scanned plurality of actually defective contacts comprising the identifiable indicium.

In one example, communication between and among the various components of FIG. 3 may be bi-directional. In another example, the communication may be carried out via the Internet, an intranet, a local area network, a wide area network and/or any other desired communication channel(s). In another example, each of the components may be operatively connected to each of the other components. In another example, some or all of these components may be implemented in a computer system of the type shown in FIG. 7.

Figure 4:
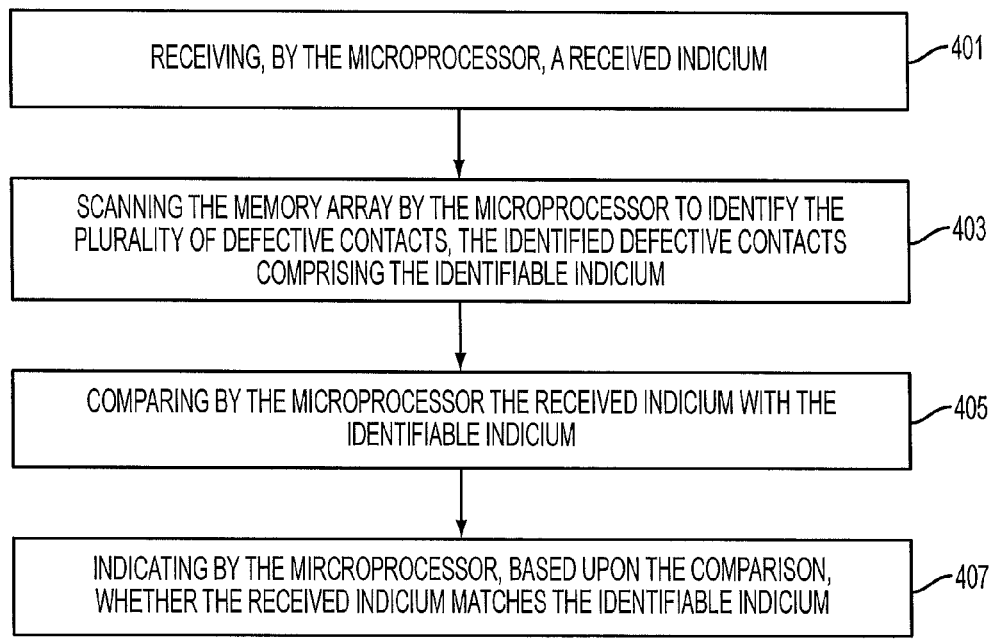
FIG. 4 depicts a flowchart of a method according to an embodiment.

Referring now to FIG. 4, a method for utilizing a semiconductor device having an identifiable indicium, the semiconductor device comprising a microprocessor and a memory array having a plurality of defective contacts, is shown. As seen in this FIG. 4, the method of this embodiment comprises: at 401—receiving, by the microprocessor, a received indicium; at 403—scanning the memory array by the microprocessor to identify the plurality of defective contacts, the identified defective contacts comprising the identifiable indicium; at 405—comparing by the microprocessor the received indicium with the identifiable indicium; and at 407—indicating by the microprocessor, based upon the comparison, whether the received indicium matches the identifiable indicium.

In one example, any steps described above may be carried out in any appropriate desired order.

In another example, the scanning step 403 may be performed as follows: write 0 or 1 to the entire array and then come back and read the 0 or 1 and compare it with expected value. The bit line and word line are varied to address each single bit.

Figure 5:
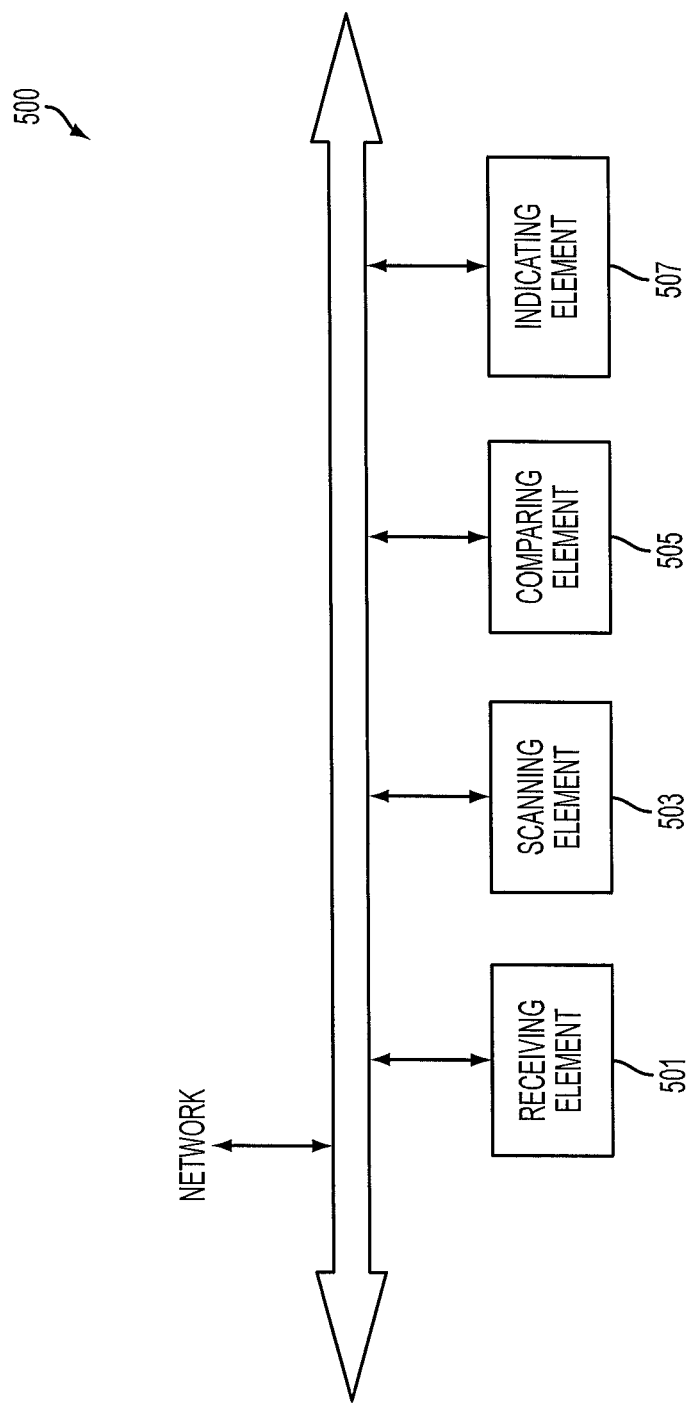
FIG. 5 depicts a block diagram of a system according to an embodiment.

Referring now to FIG. 5, in another embodiment, a system 500 for utilizing a semiconductor device having an identifiable indicium, the semiconductor device comprising a microprocessor and a memory array having a plurality of defective contacts, is provided. This system may include the following elements: a receiving element 501 configured to receive a received indicium; a scanning element 503 configured to scan the memory array to identify the plurality of defective contacts, the identified defective contacts comprising the identifiable indicium; a comparing element 505 configured to compare the received indicium with the identifiable indicium; and an indicating element 507 configured to indicate, based upon the comparison, whether the received indicium matches the identifiable indicium.

In one example, communication between and among the various components of FIG. 5 may be bi-directional. In another example, the communication may be carried out via the Internet, an intranet, a local area network, a wide area network and/or any other desired communication channel(s). In another example, each of the components may be operatively connected to each of the other components. In another example, some or all of these components may be implemented in a computer system of the type shown in FIG. 7.

Figure 6:
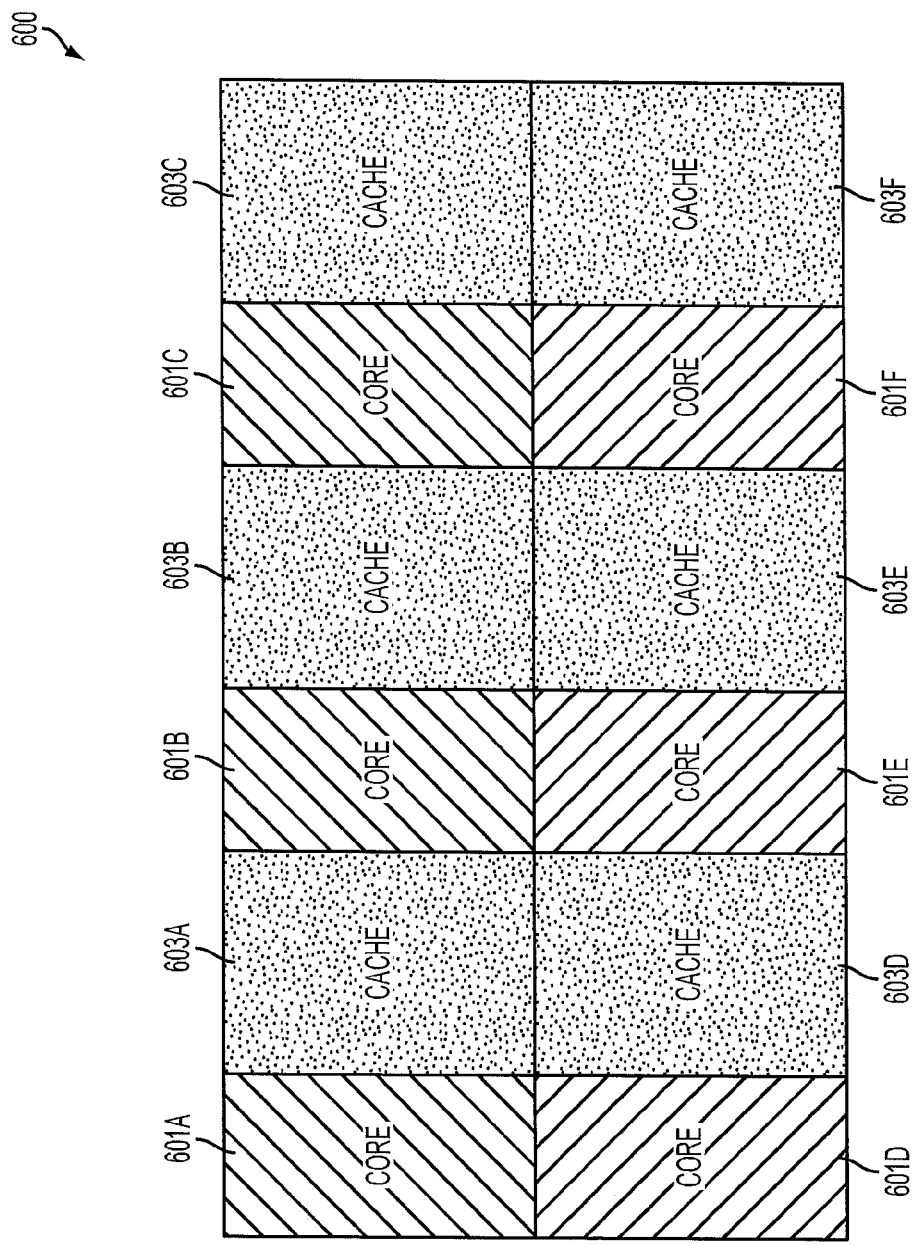
FIG. 6 depicts a block diagram of a system according to an embodiment.

Referring now to FIG. 6, a block diagram of an example semiconductor device structure is shown. As seen in this example, semiconductor device 600 may comprise a microprocessor with multiple cores 601A-601F and multiple cache memories 603A-603F. In another example, the semiconductor device may comprise any desired number of cores and/or cache memories. In yet another example, the semiconductor device may comprise a single core and/or a single cache memory.

Figure 7:
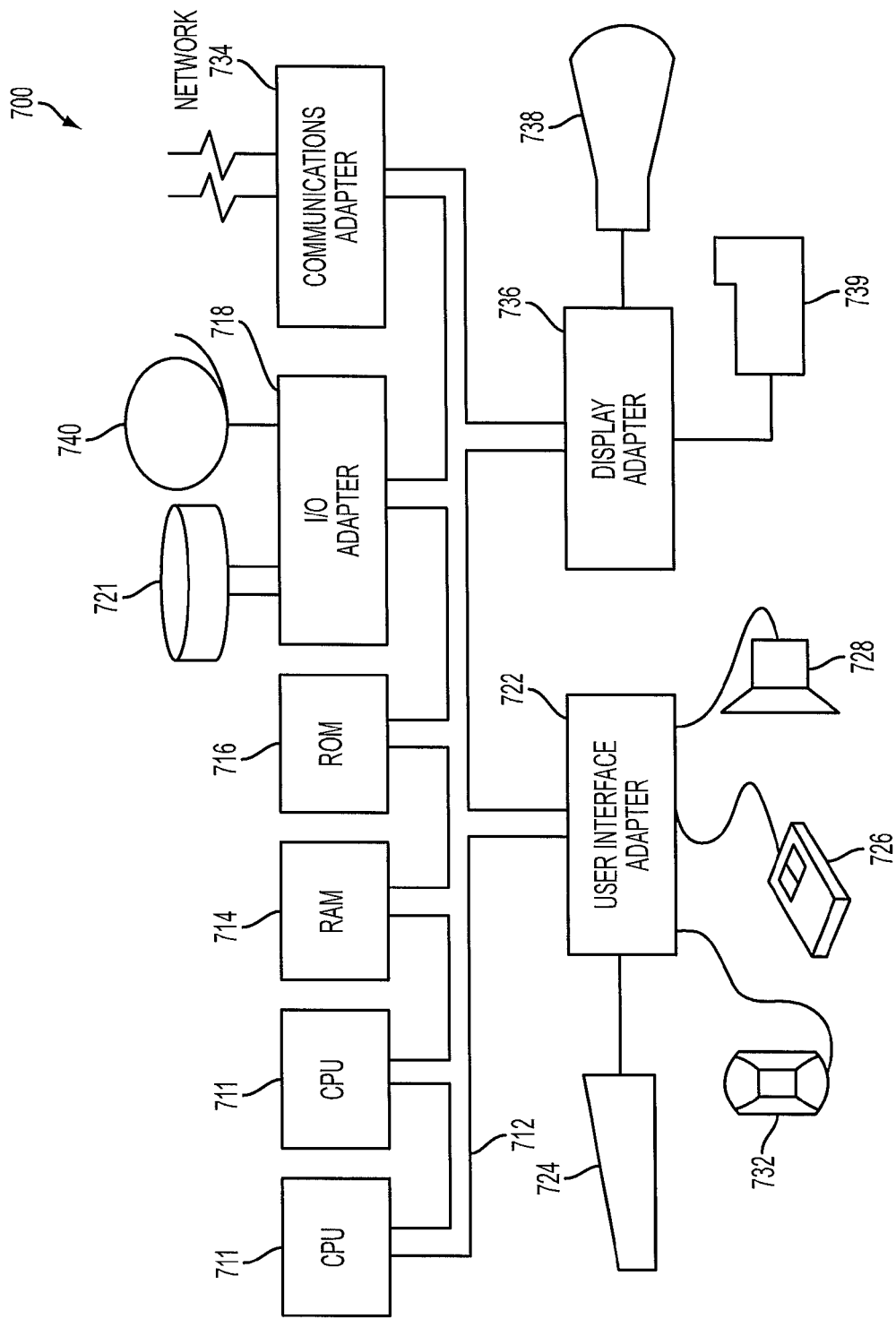
FIG. 7 depicts a block diagram of a system according to an embodiment.

Referring now to FIG. 7, this figure shows a hardware configuration of computing system 700 according to an embodiment of the present invention. As seen, this hardware configuration has at least one processor or central processing unit (CPU) 711. The CPUs 711 are interconnected via a system bus 712 to a random access memory (RAM) 714, read-only memory (ROM) 716, input/output (I/O) adapter 718 (for connecting peripheral devices such as disk units 721 and tape drives 740 to the bus 712), user interface adapter 722 (for connecting a keyboard 724, mouse 726, speaker 728, microphone 732, and/or other user interface device to the bus 712), a communications adapter 734 for connecting the system 700 to a data processing network, the Internet, an Intranet, a local area network (LAN), etc., and a display adapter 736 for connecting the bus 712 to a display device 738 and/or printer 739 (e.g., a digital printer or the like).

In one embodiment, a method for manufacturing a semiconductor device having an identifiable indicium, the semiconductor device comprising a microprocessor and a memory array having a plurality of contacts, is provided, the method comprising: designing a nominal layout of the contacts of the memory array; designing a nominal photo lithography mask for producing the nominal layout of the contacts of the memory array; selecting a plurality of the contacts of the designed memory array for production as defective contacts; producing the photo lithography mask based upon: (a) the designed nominal photo lithography mask; and (b) the selected contacts to be produced as defective contacts; manufacturing the semiconductor device including the microprocessor and the memory array using the produced photo lithography mask, wherein the manufactured memory array includes a plurality of actually defective contacts; and scanning the memory array by the microprocessor to identify the plurality of actually defective contacts, the scanned plurality of actually defective contacts comprising the identifiable indicium.

In one example, the memory array is a cache memory.

In another example, the memory array comprises a plurality of bit lines and the selecting the plurality of contacts for production as defective contacts comprises selecting a subset of the plurality of bit lines for production as defective contacts.

In another example, the selecting the subset of the plurality of bit lines comprises randomly selecting the subset of the plurality of bit lines.

In another example, the number of bit lines selected is in the range of between 10 and 100 bit lines.

In another example, each bit line has 64 bits and the number of bits selected for production as defective contacts is in the range of about 640 to 6400.

In another example: the scanning comprises scanning the memory array by the microprocessor to identify the locations of the plurality of actually defective contacts; and the scanned the locations of the plurality of actually defective contacts comprise the identifiable indicium.

Figure 8:
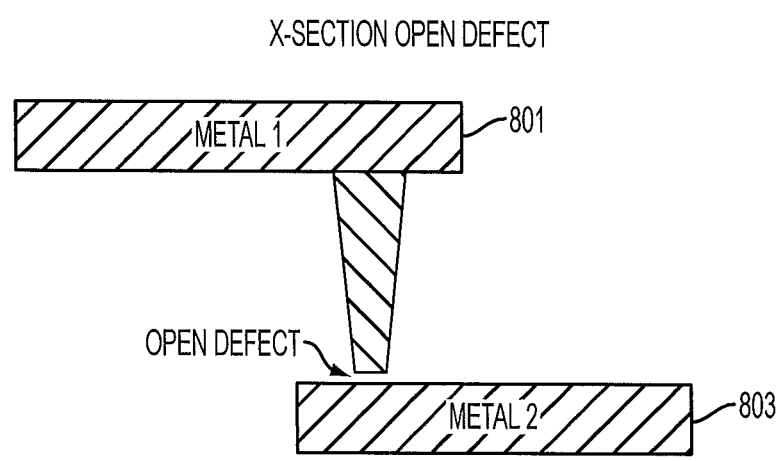
FIG. 8 depicts a cross-section view of an example open circuit defect.

In another example, at least some of the plurality of actually defective contacts are open circuit defects (see, e.g., FIG. 8 showing an example open circuit defect between metal 1 (call out number 801) and metal 2 (call out number 803).

Figure 9:
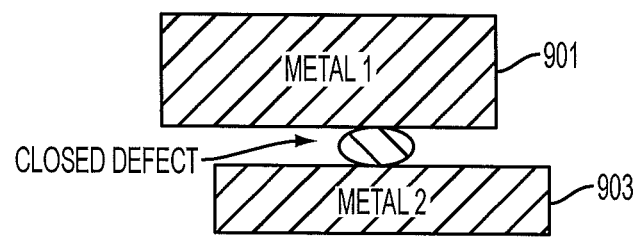
FIG. 9 depicts a top down view of an example closed circuit defect.

In another example, at least some of the plurality of actually defective contacts are closed circuit defects (see, e.g., FIG. 9 showing an example closed circuit defect between metal 1 (call out number 901) and metal 2 (call out number 903).

In another example, the identifiable indicium is unique.

In another embodiment, a method for utilizing a semiconductor device having an identifiable indicium, the semiconductor device comprising a microprocessor and a memory array having a plurality of defective contacts, is provided, the method comprising: receiving, by the microprocessor, a received indicium; scanning the memory array by the microprocessor to identify the plurality of defective contacts, the identified defective contacts comprising the identifiable indicium; comparing by the microprocessor the received indicium with the identifiable indicium; and indicating by the microprocessor, based upon the comparison, whether the received indicium matches the identifiable indicium.

In one example, the memory array is a cache memory.

In another example, the memory array comprises a plurality of bit lines and the defective contacts comprises subset of the plurality of bit lines.

In another example, the subset of the plurality of bit lines comprises a randomly selected subset of the plurality of bit lines.

In another example, the number of bit lines with defective contacts is in the range of between 10 and 100 bit lines.

In another example, each bit line has 64 bits and the number of bits that are defective contacts is in the range of about 640 to 6400.

In another example: the scanning comprises scanning the memory array by the microprocessor to identify the locations of the plurality of actually defective contacts; and the scanned the locations of the plurality of actually defective contacts comprise the identifiable indicium.

In another example, at least some of the plurality of defective contacts are open circuit defects.

In another example, at least some of the plurality of defective contacts are closed circuit defects.

In another example, the identifiable indicium is unique.

In another embodiment, a computer readable storage medium, tangibly embodying a program of instructions executable by the computer for manufacturing a semiconductor device having an identifiable indicium, the semiconductor device comprising a microprocessor and a memory array having a plurality of contacts, is provided, the program of instructions, when executing, performing the following steps: designing a nominal layout of the contacts of the memory array; designing a nominal photo lithography mask for producing the nominal layout of the contacts of the memory array; selecting a plurality of the contacts of the designed memory array for production as defective contacts; producing the photo lithography mask based upon: (a) the designed nominal photo lithography mask; and (b) the selected contacts to be produced as defective contacts; manufacturing the semiconductor device including the microprocessor and the memory array using the produced photo lithography mask, wherein the manufactured memory array includes a plurality of actually defective contacts; and scanning the memory array by the microprocessor to identify the plurality of actually defective contacts, the scanned plurality of actually defective contacts comprising the identifiable indicium.

In one example, each of the plurality of actually defective contacts is selected from the group of: (a) an open circuit defect; and (b) a closed circuit defect.

In another embodiment, a computer readable storage medium, tangibly embodying a program of instructions executable by a microprocessor of a semiconductor device for utilizing an identifiable indicium of the semiconductor device, the semiconductor device comprising the microprocessor and a memory array having a plurality of defective contacts, is provided, the program of instructions, when executing, causing the microprocessor to perform the following steps: receiving a received indicium; scanning the memory array to identify the plurality of defective contacts, the identified defective contacts comprising the identifiable indicium; comparing the received indicium with the identifiable indicium; and indicating, based upon the comparison, whether the received indicium matches the identifiable indicium.

In one example, each of the plurality of defective contacts is selected from the group of: (a) an open circuit defect; and (b) a closed circuit defect.

In other examples, any steps described herein may be carried out in any appropriate desired order.

In another example, features or defects which may be used for chip identification may be based upon changes to bit line critical dimension and/or changes to pattern density (e.g., to modulate thickness). That is, density of holes and/or lines may be non-uniform to provide identification information (it is typically desired to have uniform density).

In another example, the semiconductor device may operate as a "black box." In one specific example, the semiconductor device may have hardcoded instructions to: (a) scan for; (b) obtain; and/or (c) output the identification information. In another specific example, the semiconductor device may have hardcoded instructions to: (a) receive first information (e.g., a purported key or password); (b) scan for and obtain the identification information (that is, identification information of the chip); (c) compare the received first information with the obtained identification information; (d) output a result of the comparison (e.g., whether the received first information is the same as the obtained identification information); and/or (e) perform one or more actions based on the result of the comparison (e.g., whether the received first information is the same as the obtained identification information).

In another example, the defect information hardcoded into the chip may provide a key for an encrypted file, an encrypted directory, an encrypted memory device or the like.

In another example, the defect information hardcoded into the chip may provide a key for permitting one or more actions (e.g., file read, file write, file access, network communication).

In another example, the number of defective contacts itself is the ID information. In another example, the locations of the defective contacts are the ID information. In another example, the combination of the number and location of the defective contacts is the ID information.

As described herein are mechanisms for chip identification using defects. In one specific example, the defects may be intentionally produced using mask (e.g., photo lithography mask) critical dimension(s).

In another example, the identification described herein may be applied to FET and/or CMOS devices.

As described herein, various embodiments may be provided in the context of: semiconductor processing; computers (e.g., servers); and/or systems and software management.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any programming language or any combination of one or more programming languages, including an object oriented programming language such as Java, Smalltalk, C++ or the like or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described herein with reference to flowchart illustrations and/or block diagrams of methods, systems and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus or other devices provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:

1. A method for manufacturing a semiconductor device having an identifiable indicium, the semiconductor device comprising a microprocessor and a memory array having a plurality of contacts, the method comprising:
    designing a nominal layout of the contacts of the memory array;
    designing a nominal photo lithography mask for producing the nominal layout of the contacts of the memory array;
    selecting a plurality of the contacts of the designed memory array for production as defective contacts;
    producing the photo lithography mask based upon: (a) the designed nominal photo lithography mask; and (b) the selected contacts to be produced as defective contacts;
    manufacturing the semiconductor device including the microprocessor and the memory array using the produced photo lithography mask, wherein the manufactured memory array includes a plurality of actually defective contacts; and
    scanning the memory array by the microprocessor to identify the plurality of actually defective contacts, the scanned plurality of actually defective contacts comprising the identifiable indicium.

2. The method of claim 1, wherein the memory array is a cache memory.

3. The method of claim 1, wherein the memory array comprises a plurality of bit lines and the selecting the plurality of contacts for production as defective contacts comprises selecting a subset of the plurality of bit lines for production as defective contacts.

4. The method of claim 3, wherein the selecting the subset of the plurality of bit lines comprises randomly selecting the subset of the plurality of bit lines.

5. The method of claim 3, wherein the number of bit lines selected is in the range of between 10 and 100 bit lines.

6. The method of claim 5, wherein each bit line has 64 bits and the number of bits selected for production as defective contacts is in the range of about 640 to 6400.

7. The method of claim 1, wherein:
the scanning comprises scanning the memory array by the microprocessor to identify the locations of the plurality of actually defective contacts; and
the scanned the locations of the plurality of actually defective contacts comprise the identifiable indicium.

8. The method of claim 1, wherein at least some of the plurality of actually defective contacts are open circuit defects.

9. The method of claim 1, wherein at least some of the plurality of actually defective contacts are closed circuit defects.

10. The method of claim 1, wherein the identifiable indicium is unique.

11. A method for utilizing a semiconductor device having an identifiable indicium, the semiconductor device comprising a microprocessor and a memory array having a plurality of defective contacts, the method comprising:
receiving, by the microprocessor, a received indicium;
scanning the memory array by the microprocessor to identify the plurality of defective contacts, the identified defective contacts comprising the identifiable indicium;
comparing by the microprocessor the received indicium with the identifiable indicium; and
indicating by the microprocessor, based upon the comparison, whether the received indicium matches the identifiable indicium.

12. The method of claim 11, wherein the memory array is a cache memory.

13. The method of claim 11, wherein the memory array comprises a plurality of bit lines and the defective contacts comprises subset of the plurality of bit lines.

14. The method of claim 13, wherein the subset of the plurality of bit lines comprises a randomly selected subset of the plurality of bit lines.

15. The method of claim 13, wherein the number of bit lines with defective contacts is in the range of between 10 and 100 bit lines.

16. The method of claim 15, wherein each bit line has 64 bits and the number of bits that are defective contacts is in the range of about 640 to 6400.

17. The method of claim 11, wherein:
the scanning comprises scanning the memory array by the microprocessor to identify the locations of the plurality of actually defective contacts; and
the scanned the locations of the plurality of actually defective contacts comprise the identifiable indicium.

18. The method of claim 11, wherein at least some of the plurality of defective contacts are open circuit defects.

19. The method of claim 11, wherein at least some of the plurality of defective contacts are closed circuit defects.

20. The method of claim 11, wherein the identifiable indicium is unique.

21. A computer readable storage medium, tangibly embodying a program of instructions executable by the computer for manufacturing a semiconductor device having an identifiable indicium, the semiconductor device comprising a microprocessor and a memory array having a plurality of contacts, the program of instructions, when executing, performing the following steps:
designing a nominal layout of the contacts of the memory array;
designing a nominal photo lithography mask for producing the nominal layout of the contacts of the memory array;
selecting a plurality of the contacts of the designed memory array for production as defective contacts;
producing the photo lithography mask based upon: (a) the designed nominal photo lithography mask; and (b) the selected contacts to be produced as defective contacts;
manufacturing the semiconductor device including the microprocessor and the memory array using the produced photo lithography mask, wherein the manufactured memory array includes a plurality of actually defective contacts; and
scanning the memory array by the microprocessor to identify the plurality of actually defective contacts, the scanned plurality of actually defective contacts comprising the identifiable indicium.

22. The computer readable storage medium of claim 21, wherein each of the plurality of actually defective contacts is selected from the group of: (a) an open circuit defect; and (b) a closed circuit defect.

23. A computer readable storage medium, tangibly embodying a program of instructions executable by a microprocessor of a semiconductor device for utilizing an identifiable indicium of the semiconductor device, the semiconductor device comprising the microprocessor and a memory array having a plurality of defective contacts, the program of instructions, when executing, causing the microprocessor to perform the following steps:
receiving a received indicium;
scanning the memory array to identify the plurality of defective contacts, the identified defective contacts comprising the identifiable indicium;
comparing the received indicium with the identifiable indicium; and
indicating, based upon the comparison, whether the received indicium matches the identifiable indicium.

24. The computer readable storage medium of claim 23, wherein each of the plurality of defective contacts is selected from the group of: (a) an open circuit defect; and (b) a closed circuit defect.

* * * * *